US012585762B2

(12) United States Patent
Balch et al.

(10) Patent No.: US 12,585,762 B2
(45) Date of Patent: Mar. 24, 2026

(54) METHOD AND SYSTEM FOR DETECTING ANOMALOUS BEHAVIOR IN STREAM DATA

(71) Applicant: JPMorgan Chase Bank, N.A., New York, NY (US)

(72) Inventors: Tucker Richard Balch, Suwanee, GA (US); Veronica Mejia Bustamante, New York, NY (US); Naan Cho, New York, NY (US); Matthew Howard, Pacific Palisades, CA (US); Maxime Kawawa-Beaudan, Berkeley, CA (US); Ganapathy Mani, New York, NY (US); Ivan Rankenburg, Philadelphia, PA (US); Andrew J. Schrager, West Orange, NJ (US); Srijan Sood, New York, NY (US); Jared Vann, London (GB); Manuela Veloso, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 201 days.

(21) Appl. No.: 18/120,160

(22) Filed: Mar. 10, 2023

(65) Prior Publication Data

US 2024/0303323 A1      Sep. 12, 2024

(51) Int. Cl.
*G06F 21/55*       (2013.01)
*G06F 11/07*       (2006.01)
*G06F 21/56*       (2013.01)

(52) U.S. Cl.
CPC ........ *G06F 21/554* (2013.01); *G06F 11/0751* (2013.01); *G06F 21/566* (2013.01)

(58) Field of Classification Search
CPC ... G06F 21/554; G06F 11/0751; G06F 21/566
See application file for complete search history.

(56) References Cited

U.S. PATENT DOCUMENTS

| | | | | |
|---|---|---|---|---|
| 2019/0228296 A1* | 7/2019 | Gefen | ...................... | G06N 7/01 |
| 2021/0326438 A1* | 10/2021 | Dichiu | ............... | G06F 3/0673 |
| 2022/0070619 A1* | 3/2022 | White | ............... | H04M 1/72454 |
| 2022/0131767 A1* | 4/2022 | Manthena | ............... | H04L 43/16 |
| 2022/0309387 A1* | 9/2022 | Rodriguez | ........... | H04L 9/3213 |
| 2022/0318118 A1* | 10/2022 | Adamson | ........... | G06F 11/3419 |
| 2022/0417274 A1* | 12/2022 | Madanahalli | ....... | H04W 12/121 |
| 2023/0052225 A1* | 2/2023 | Edington | ........... | G06Q 30/0201 |
| 2024/0345911 A1* | 10/2024 | Bellam | ............... | G06F 11/0709 |
| 2024/0370328 A1* | 11/2024 | Balla | ...................... | G06N 20/00 |

* cited by examiner

*Primary Examiner* — Amir Mehrmanesh
*Assistant Examiner* — Raghavender Cholleti
(74) *Attorney, Agent, or Firm* — Greenblum & Bernstein, P.L.C.

(57) ABSTRACT

A method and a system for detecting an anomalous sequence of events in stream data are provided. The method includes: receiving a first set of raw data; analyzing the first set of raw data in order to determine a first event sequence; applying a first Hidden Markov Model (HMM) to the first event sequence in order to generate a first output; and determining, based on the first output, whether the first event sequence is classifiable as being an anomalous event sequence. The HMM is trained by using known sequences of normal events and event sequences that are known to be anomalous.

17 Claims, 7 Drawing Sheets

200

100

102

400

Receive Raw Data S402

Preprocess Raw Data S404

Analyze Raw Data to Determine Event Sequence
S406

Apply Hidden Markov Model (HMM) to Event Sequence
S408

Use HMM Output to Determine Whether Event Sequence is
Anomalous S410

700

800

```
Algorithm 1: Clustering approach for HMM training.
Input: number of clusters N_c, N_s sequences
Output: N_c trained HMMs
assignments ← random_assignment();
done ← False;
for 0 ≤ j < N_c do
    HMM_j ← random_HMM();
end
while done == False do
    # Train each HMM on its assigned sequences.
    for 0 ≤ j < N_c do
        cluster_j ← [];
        for 0 ≤ i < N_s do
            if assignments[i] == j then
                cluster_j ← cluster_j + sequences[i];
            end
        end
        HMM_j ← train_HMM(cluster_j);
    end
    # Reassign sequences to highest scoring HMM's cluster.
    done ← True;
    for 0 ≤ i < N_s do
        max_score ← −∞;
        max_scoring_hmm ← 0;
        for 0 ≤ j < N_c do
            if score(HMM_j, sequences[i]) > max_score then
                max_score ← score(HMM_j, sequences[i]);
                max_scoring_hmm ← j;
            end
        end
        if assignments[i] ≠ max_scoring_hmm then
            done ← False;
        end
        assignments[i] ← max_scoring_hmm;
    end
end
```

FIG. 8

METHOD AND SYSTEM FOR DETECTING ANOMALOUS BEHAVIOR IN STREAM DATA

BACKGROUND

1. Field of the Disclosure

This technology generally relates to detecting anomalous behavior in stream data, and more particularly to methods and systems for using algorithms that employ Hidden Markov Models (HMMs) for detecting anomalous sequences of events in stream data.

2. Background Information

Many organizations engage in interactions with customers. In this aspect, it is important to be aware of circumstances that indicate or suggest anomalous behavior in the context of these interactions. For example, a financial institution that engages in transactions with customers needs to be aware of anomalous behavior that indicates a likelihood of malicious trading practices and/or market misconduct.

Given large sequences of high-frequency, high-resolution data from various agents, it may be possible to determine whether such sequences represent normal or anomalous behavior. One way of making such a determination involves the use of machine learning models that use artificial intelligence techniques for detecting anomalies.

Accordingly, there is a need for a method for using algorithms that employ Hidden Markov Models (HMMs) for detecting anomalous sequences of events in stream data.

SUMMARY

The present disclosure, through one or more of its various aspects, embodiments, and/or specific features or sub-components, provides, inter alia, various systems, servers, devices, methods, media, programs, and platforms for methods and systems for using algorithms that employ Hidden Markov Models (HMMs) for detecting anomalous sequences of events in stream data.

According to an aspect of the present disclosure, a method for detecting an anomalous sequence of events in stream data is provided. The method is implemented by at least one processor. The method includes: receiving, by the at least one processor, a first set of raw data; analyzing, by the at least one processor, the first set of raw data in order to determine a first event sequence; applying, by the at least one processor, a first HMM to the first event sequence in order to generate a first output; and determining, by the at least one processor based on the first output, whether the first event sequence is classifiable as being an anomalous event sequence.

The method may further include: after the receiving of the first set raw data and before the analyzing of the first set of raw data, preprocessing the first set of raw data by performing at least one from among removing at least one null value, removing at least one incomplete action, and eliminating at least one duplication.

The analyzing may include assigning a predetermined first time interval to the first set of raw data in order to determine whether a particular event is eligible for inclusion in the first event sequence.

For each respective pair of consecutive events that are determined as being eligible for inclusion in the first event sequence, the analyzing may further include comparing a predetermined second time interval with a corresponding pause between a first event of the respective pair and a second event of the respective pair in order to determine whether the second event remains eligible for inclusion in the first event sequence.

The analyzing may further include tokenizing the raw data in order to generate a first set of actions that is attributable to at least one from among a first agent, a first process identifier, and a first account.

For each respective event included in the first event sequence, the first output may include a corresponding value having a magnitude that indicates a relative size of the respective event with respect to other events included in the first event sequence.

The method may further include categorizing each corresponding value as referring to one from among a small action, a medium-sized action, and a large action.

The method may further include: before the applying of the first HMM, training the first HMM by using first historical data that relates to known normal event sequences and second historical data that relates to known anomalous event sequences.

The applying of the HMM may include providing a first set of observations as an input. The first output may include a score of the first event sequence that indicates a likelihood that the first event sequence occurs based on the inputted first set of observations.

According to another exemplary embodiment, a computing apparatus for detecting an anomalous sequence of events in stream data is provided. The computing apparatus includes a processor; a memory; and a communication interface coupled to each of the processor and the memory. The processor is configured to: receive, via the communication interface, a first set of raw data; analyze the first set of raw data in order to determine a first event sequence; apply a first HMM to the first event sequence in order to generate a first output; and determine, based on the first output, whether the first event sequence is classifiable as being an anomalous event sequence.

The processor may be further configured to: after the first set raw data has been received and before the analysis of the first set of raw data, preprocess the first set of raw data by performing at least one from among removing at least one null value, removing at least one incomplete action, and eliminating at least one duplication.

The processor may be further configured to assign a predetermined first time interval to the first set of raw data in order to determine whether a particular event is eligible for inclusion in the first event sequence.

For each respective pair of consecutive events that are determined as being eligible for inclusion in the first event sequence, the processor may be further configured to compare a predetermined second time interval with a corresponding pause between a first event of the respective pair and a second event of the respective pair in order to determine whether the second event remains eligible for inclusion in the first event sequence.

The processor may be further configured to tokenize the raw data in order to generate a first set of actions that is attributable to at least one from among a first agent, a first process identifier, and a first account.

For each respective event included in the first event sequence, the first output may include a corresponding value having a magnitude that indicates a relative size of the respective event with respect to other events included in the first event sequence.

The processor may be further configured to categorize each corresponding value as referring to one from among a small action, a medium-sized action, and a large action.

The processor may be further configured to: before the application of the first HMM, train the first HMM by using first historical data that relates to known normal event sequences and second historical data that relates to known anomalous event sequences.

The application of the HMM may include providing a first set of observations as an input, and the first output includes a score of the first event sequence that indicates a likelihood that the first event sequence occurs based on the inputted first set of observations.

According to another exemplary embodiment, a computing apparatus for detecting an anomalous sequence of events in stream data is provided. The computing apparatus includes a processor; a memory; and a communication interface coupled to each of the processor and the memory. The processor is configured to: receive a first set of raw data; analyze the first set of raw data in order to determine a first event sequence; apply a first HMM to the first event sequence in order to generate a first output; and determine, based on the first output, whether the first event sequence is classifiable as being an anomalous event sequence.

When executed by the processor, the executable code may further cause the processor to: after the first set raw data has been received and before the analysis of the first set of raw data, preprocess the first set of raw data by performing at least one from among removing at least one null value, removing at least one incomplete action, and eliminating at least one duplication.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 8 is an illustration of an algorithm that provides a clustering approach for HMM training, in accordance with an exemplary embodiment.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
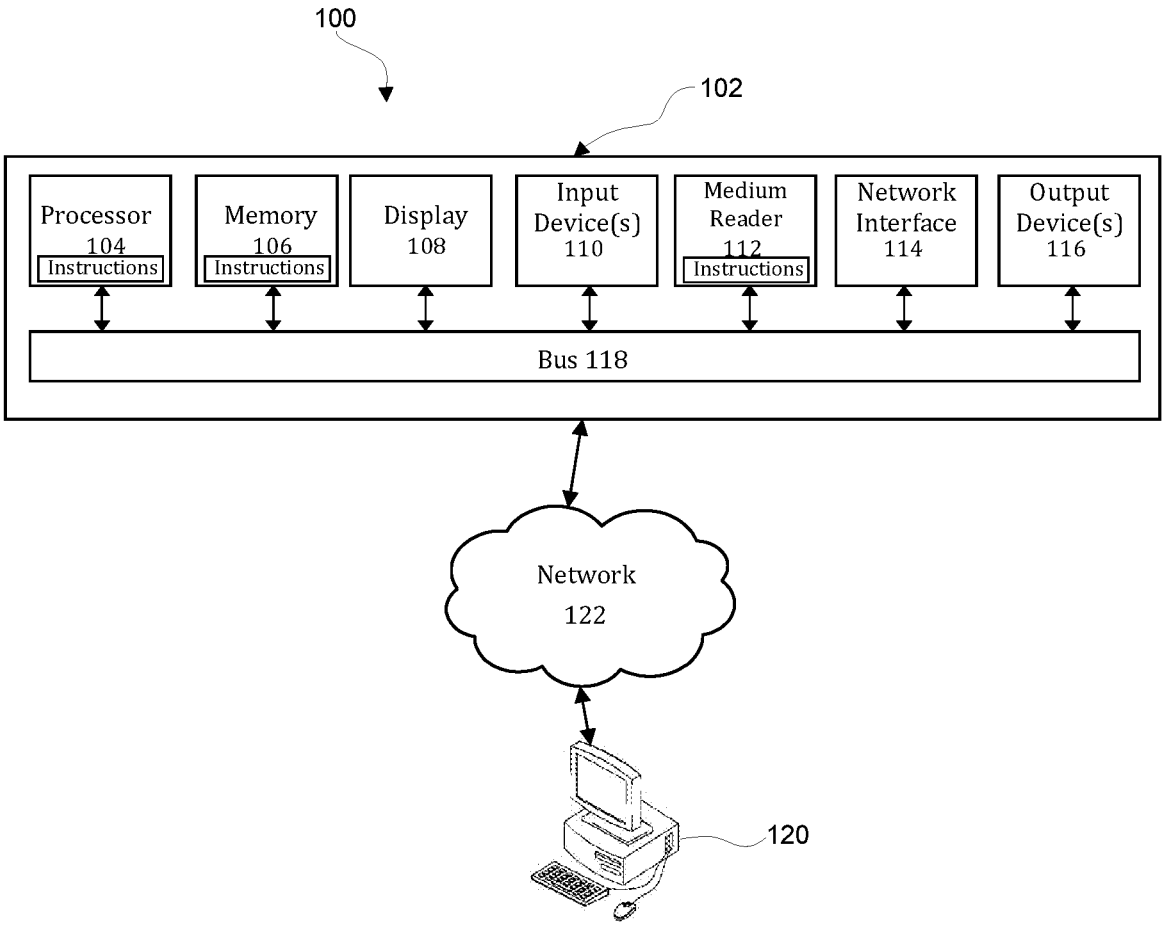
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for using algorithms that employ HMMs for detecting anomalous sequences of events in stream data.

Figure 2:
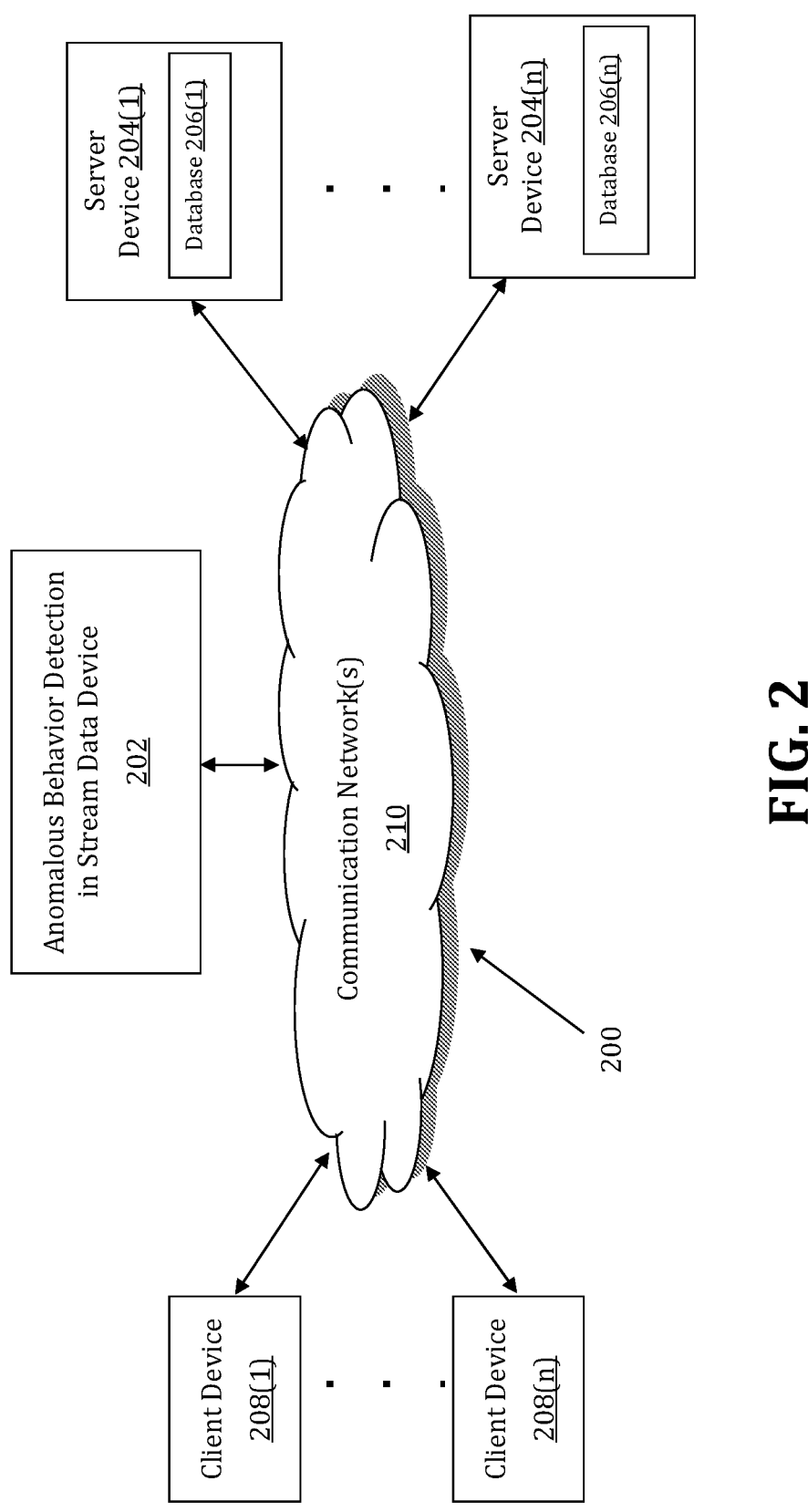
FIG. 2 illustrates an exemplary diagram of a network environment.

Referring to FIG. 2, a schematic of an exemplary network environment 200 for implementing a method for using algorithms that employ HMMs for detecting anomalous sequences of events in stream data is illustrated. In an exemplary embodiment, the method is executable on any networked computer platform, such as, for example, a personal computer (PC).

The method for using algorithms that employ HMMs for detecting anomalous sequences of events in stream data may be implemented by an Anomalous Behavior Detection in Stream Data (ABDSD) device 202. The ABDSD device 202 may be the same or similar to the computer system 102 as described with respect to FIG. 1. The ABDSD device 202 may store one or more applications that can include executable instructions that, when executed by the ABDSD device 202, cause the ABDSD device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the ABDSD device 202 itself, may be located in virtual server(s) running in a cloud-based computing environment rather than being tied to one or more specific physical network computing devices. Also, the application(s) may be running in one or more virtual machines (VMs) executing on the ABDSD device 202. Additionally, in one or more embodiments of this technology, virtual machine(s) running on the ABDSD device 202 may be managed or supervised by a hypervisor.

In the network environment 200 of FIG. 2, the ABDSD device 202 is coupled to a plurality of server devices 204(1)-204(n) that hosts a plurality of databases 206(1)-206(n), and also to a plurality of client devices 208(1)-208(n) via communication network(s) 210. A communication interface of the ABDSD device 202, such as the network interface 114 of the computer system 102 of FIG. 1, operatively couples and communicates between the ABDSD device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the ABDSD device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and ABDSD devices that efficiently implement a method for using algorithms that employ HMMs for detecting anomalous sequences of events in stream data.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The ABDSD device 202 may be a standalone device or integrated with one or more other devices or apparatuses, such as one or more of the server devices 204(1)-204(n), for example. In one particular example, the ABDSD device 202 may include or be hosted by one of the server devices 204(1)-204(n), and other arrangements are also possible. Moreover, one or more of the devices of the ABDSD device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the ABDSD device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store historical information that relates to normal and anomalous sequences of stream data and information that relates to model-specific metrics that indicate a likelihood that a particular sequence is determined as being anomalous.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the ABDSD device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the ABDSD device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the ABDSD device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the ABDSD device 202, the server devices 204(1)-204(n), or the client devices 208(1)-208(n), for example, may be configured to operate as virtual instances on the same physical machine. In other words, one or more of the ABDSD device 202, the server devices 204(1)-204(n), or the client devices 208(1)-208(n) may operate on the same physical device rather than as separate devices communicating through communication network(s) 210. Additionally, there may be more or fewer ABDSD devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
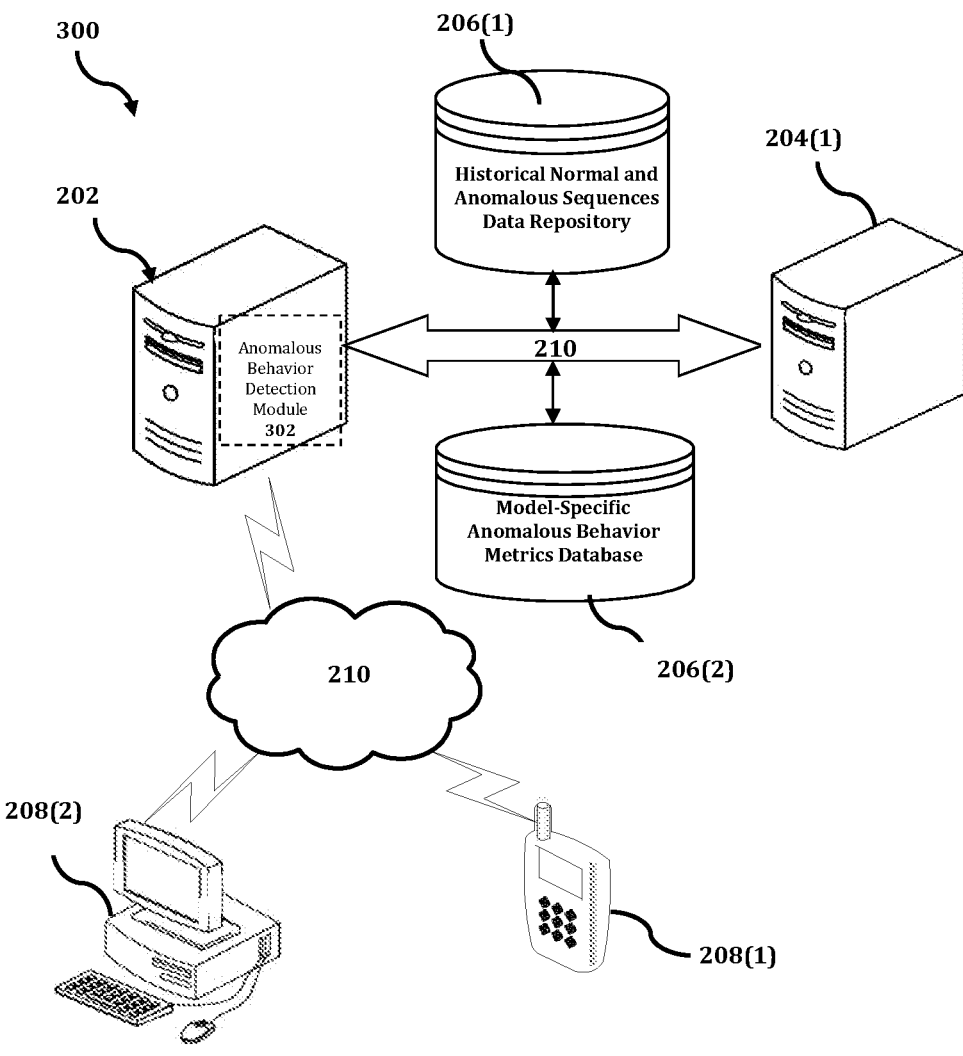
FIG. 3 shows an exemplary system for implementing a method for using algorithms that employ Hidden Markov Models (HMMs) for detecting anomalous sequences of events in stream data.

The ABDSD device 202 is described and illustrated in FIG. 3 as including an anomalous behavior detection module 302, although it may include other rules, policies, modules, databases, or applications, for example. As will be described below, the anomalous behavior detection module 302 is configured to implement a method for using algorithms that employ HMMs for detecting anomalous sequences of events in stream data.

An exemplary process 300 for implementing a mechanism for using algorithms that employ HMMs for detecting anomalous sequences of events in stream data by utilizing the network environment of FIG. 2 is illustrated as being executed in FIG. 3. Specifically, a first client device 208(1) and a second client device 208(2) are illustrated as being in communication with ABDSD device 202. In this regard, the first client device 208(1) and the second client device 208(2) may be "clients" of the ABDSD device 202 and are described herein as such. Nevertheless, it is to be known and understood that the first client device 208(1) and/or the second client device 208(2) need not necessarily be "clients" of the ABDSD device 202, or any entity described in association therewith herein. Any additional or alternative relationship may exist between either or both of the first client device 208(1) and the second client device 208(2) and the ABDSD device 202, or no relationship may exist.

Further, ABDSD device 202 is illustrated as being able to access a historical normal and anomalous sequences data repository 206(1) and a model-specific anomalous behavior metrics database 206(2). The anomalous behavior detection module 302 may be configured to access these databases for implementing a method for using algorithms that employ HMMs for detecting anomalous sequences of events in stream data.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the ABDSD device 202 via broadband or cellular communication. Of course, these embodiments are merely exemplary and are not limiting or exhaustive.

Upon being started, the anomalous behavior detection module 302 executes a process for using algorithms that employ HMMs for detecting anomalous sequences of events in stream data. An exemplary process for using algorithms that employ HMMs for detecting anomalous sequences of events in stream data is generally indicated at flowchart 400 in FIG. 4.

Figure 4:
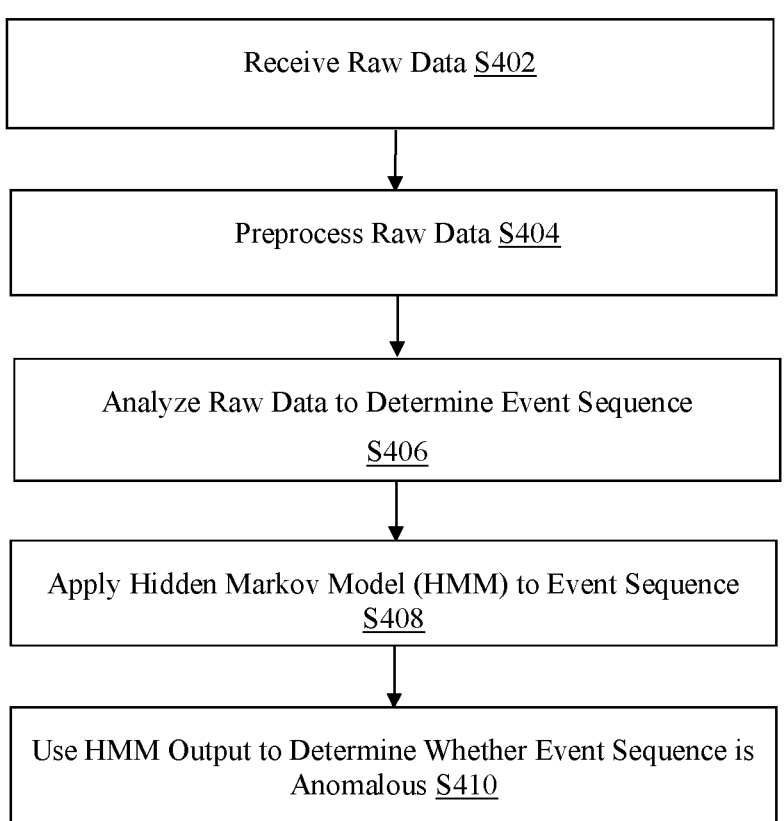
FIG. 4 is a flowchart of an exemplary process for implementing a method for using algorithms that employ HMMs for detecting anomalous sequences of events in stream data.

In process 400 of FIG. 4, at step S402, the anomalous behavior detection module 302 receives a first set of raw data. In an exemplary embodiment, the raw data includes a high-frequency list of events that is available from a source, such as, for example, a financial market. The first set of raw data may include only a few events or a large number of events, such as, for example, tens of thousands of events.

At step S404, the anomalous behavior detection module 302 preprocesses the first set of raw data. In an exemplary embodiment, the preprocessing operation may include any one or more of a removal of null values, a removal of incomplete actions, and an elimination of at least one duplication.

At step S406, the anomalous behavior detection module 302 analyzes the preprocessed raw data in order to determine an event sequence. In an exemplary embodiment, the analysis of the preprocessed data may include determining whether a particular event is to be included in the event sequence. For example, the analysis may include assigning a predetermined first time interval to the raw data in order to determine whether a particular event is eligible for inclusion in the event sequence; and then, for each respective pair of consecutive events determined as being eligible for inclusion, comparing a predetermined second time interval with a corresponding pause that occurs between the two events that comprise the respective pair, in order to determine whether the second such event remains eligible for inclusion in the event sequence. In an exemplary embodiment, the analysis may include tokenizing the raw data in order to generate a first set of actions that is attributable to any one or more of a particular agent, a particular process identifier, and a particular account.

At step S408, the anomalous behavior detection module 302 applies a HMM to the event sequence in order to generate an output. In an exemplary embodiment, the HMM is trained by using first historical data that relates to known normal event sequences and second historical data that relates to known anomalous event sequences.

In an exemplary embodiment, for each respective event included in the event sequence, the output generated by the HMM may include a corresponding value having a magnitude that indicates a relative size of the respective event with respect to other events included in the event sequence. For example, each event may receive a score that may be categorized as referring to one of a small action/small event, a medium-sized action/medium-sized event, or a large action/large event.

In an exemplary embodiment, the application of the HMM may include providing a set of observations as an input, and the output of the HMM may include a score that indicates a likelihood that the event sequence occurs based on the inputted set of observations. Then, at step S410, the anomalous behavior detection module 302 uses the HMM output to determine whether the event sequence is classifiable as an anomalous event sequence. For example, in a scenario for which the HMM is trained for recognizing normal financial transactions and anomalous financial transactions that may indicate activity such as malicious trading practices and/or market misconduct, the anomalous behavior detection module 302 may use the score outputted by the HMM to distinguish between normal transactional activity and anomalous transactional activity.

Figures 5, 6:
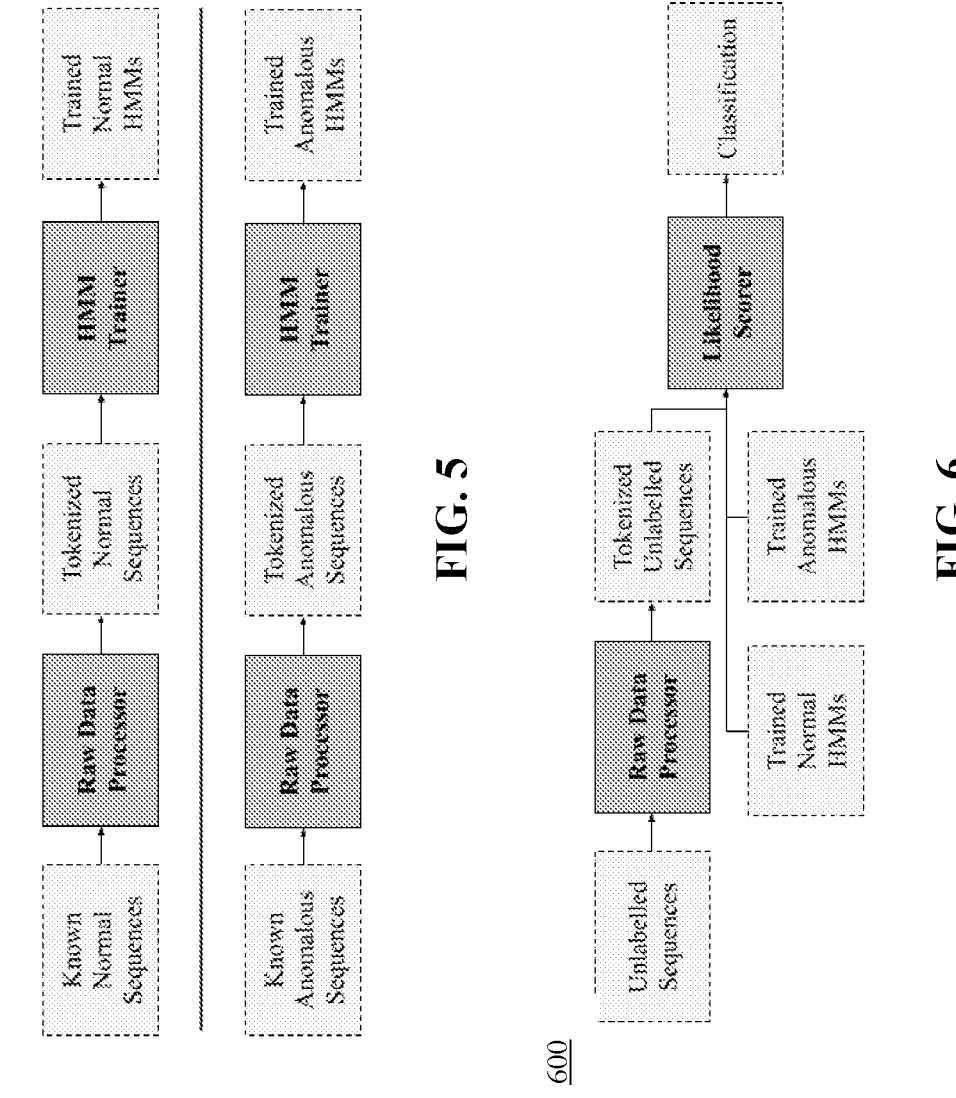
FIG. 5 is a block diagram that illustrates an architecture for training HMMs from known normal sequences and known anomalous sequences, in accordance with an exemplary embodiment.
FIG. 6 is a block diagram that illustrates an architecture for training HMMs to classify previously unseen and unlabeled sequences, in accordance with an exemplary embodiment.

FIG. 5 is a block diagram 500 that illustrates an architecture for training HMMs from known normal sequences and known anomalous sequences, in accordance with an exemplary embodiment. FIG. 6 is a block diagram 600 that illustrates an architecture for training HMMs to classify previously unseen and unlabeled sequences, in accordance with an exemplary embodiment.

Referring to FIGS. 5 and 6, in an exemplary embodiment, a system and a method for detecting anomalous sequences of events in stream data include three fundamental components: (1) data representation, (2) an algorithm for training a library of Hidden Markov Models (HMMs) from known sequences of normal and anomalous behavior, and (3) an algorithm for deploying the trained library of HMMs against new sequences, i.e., previously unseen and unlabeled sequences.

Given large sequences of high-frequency, high-resolution data from various agents, an objective is to determine whether these sequences represent normal or anomalous behavior. A small labeled dataset is collected, with labels at the sequence level where each sequence is identified to the system as being either "normal" or "anomalous," and models are trained to generalize these labels in order to categorize unseen data. A general approach to training is illustrated in FIG. 5, and an approach to deployment is illustrated in FIG. 6. In an exemplary embodiment, HMMs are leveraged to model the problem in an explainable fashion, and the predictions of multiple such models are aggregated in order to make a final classification.

Tokenization: In an exemplary problem setting scenario, high-frequency lists of events from financial markets are received as the raw data. Given the high dimensionality and frequency of such data, the raw data must be tokenized in order to reduce it into a manageable set of events that includes a relatively small number of events.

In an exemplary embodiment, the raw data entries may vary from a few events to tens of thousands of events. This results in a large and complex data structure with substantial number of features. The data source contains a large collection of raw data files that vary in sizes from a few to several hundred gigabytes. Thus, the raw data processor collects data using batch processing, i.e., the storage of data occurs in batches and each batch of data is associated with a set of unique identifiers, such as, for example, a process identifier, an acting agent, and/or a group identifier.

In an exemplary embodiment, the raw data obtained from the source is preprocessed to remove null values, remove incomplete actions, and eliminate duplicates.

In an exemplary embodiment, post-processing of raw data yields a clean set of consecutive actions that can be attributed to a particular agent, process identifier, or account which have taken place at mixed time intervals. In this aspect, it is not necessary that actions have taken place in any particular predefined time lengths. The resulting "tokens" are combined with the agent's actions in order to form sequences of consecutive events. In addition, a magnitude of value for each action is captured and categorized as small, medium or large relative to other similar actions in the time frame. The final table of observed and time stamped actions is tokenized by record and transformed into multiple sequences of events.

In an exemplary embodiment, the following assumptions may be used as defining parameters to establish a sequence of events: 1) Events within a predefined first time window are assumed to be part of a single unique sequence. For example, the predefined first time window may be equal to ten (10) minutes. 2) A pause of up to a predefined second time window is allowed between each event in the sequence. For example, the predetermined time window may be equal to sixty (60) seconds. 3) A combination of a minimum of number of events will be considered and processed as a full sequence. For example, the minimum number of events may be equal to ten (10) tokens. 4) The value associated with each event is categorized by percentiles. For example, the sixtieth percentile may be used to denote an event associated with a small value, and the ninetieth percentile may be used to denote an event associated with a large value.

In an exemplary embodiment, these sequences are independent and mutually exclusive. Each token in the sequence of events is associated with single agent entity and can directly map to a consecutive list of observed actions. Using the assumptions defined above, several tokens are grouped to form a sequence. The goal of the system and methods proposed is to identify whether a tokenized sequence of events is anomalous.

Hidden Markov Model Training: In exemplary embodiment, HMMs are employed. An HMM consists of three parameter sets: an initial state distribution, a transition matrix, and an observation matrix (also known as emission matrix). 1) The initial state distribution is the starting distribution over states ($p_{X_1}(i)$). 2) Transition matrix: Given the current state, the next state can be described as $px_{k+1|x^k(x_{k+1}|x_k)}=\alpha(x_{k+1}|x_k)$. This is represented as a matrix, where columns correspond to next state, rows corresponds to current state, and an entry corresponds to transition probability. 3) Observation matrix: Given the current state, the emission matrix's output can be described as $p_{Y_k|X_k}(y_k|x_k)=\beta(y_k|x_k)$.

In an exemplary embodiment, to train the HMMs, we use an expectation maximization (EM) algorithm know as Baum-Welch, which uses the forward-backward algorithm in its expectation step.

Figure 7:
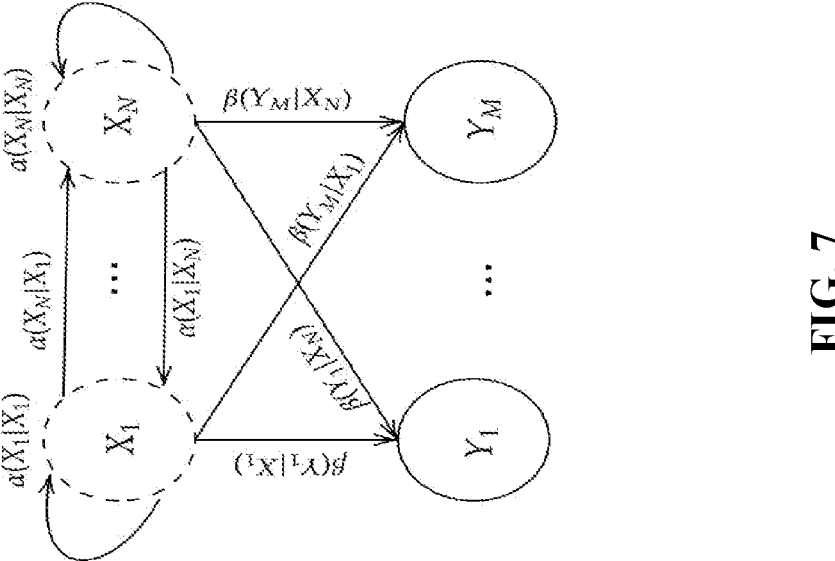
FIG. 7 is a diagram that illustrates a structure of an HMM with N states, M possible emissions, transition probabilities, and emission probabilities, in accordance with an exemplary embodiment.

FIG. 7 is a diagram 700 that illustrates a structure of an HMM with N states, i.e., X1 through XN; M possible emissions, i.e., Y1 through YM); transition probabilities $\alpha(X_{k+1}|X_k)$; and emission probabilities $\beta(Y_k|X_k)$. Each state depends only on the previous state, and each emission depends only on the current state. Each state has a static probability distribution over observable emissions.

In an exemplary embodiment, an objective is to identify an anomalous sequence that signals that the intention of the agent is to initiate an action that causes a change in the environment which benefits an intended separate and independent action. Overall, general constraints placed on the training include: 1) sequences that must be identified as anomalous activity; 2) sequences that must be identified as normal activity; and 3) the remaining sequences in the training set can be identified as either normal or an anomaly, but the percentage of anomalous activity flagged by the system must be minimal and precise.

The HMM is trained using the known anomalous activity that is publicly available to access. In an exemplary embodiment, the anomalous sequences of events to be flagged follow the step-by-step pattern below: 1) A genuine action exists. 2) A large value initiation action is placed to create a move up or move down in the environment. 3) A genuine transaction takes place. 4) The large initiation action is canceled.

Library of HMMs: In an exemplary embodiment, given a group of sequences known to represent anomalous behavior and a group of sequences known to represent normal behavior, the method learns a library of HMMs, where each HMM is trained on a subset of sequences. Given an unseen sequence of observations and the task of classifying it as anomalous or normal, the method uses the Viterbi algorithm to identify the most likely sequence of states underlying these observations.

The Viterbi algorithm takes as input a trained HMM, consisting of learned parameters $p_{X_i}(i)$ (initial state distribution), $px_{k+1|x^k}(x_{k+1}|x_k)$ (transition distribution), and $P_{Y_k|X_{k+1}(j)^k}|x_k)$ (observation distribution). It also takes as input a sequence of observations {$Y_1, \ldots, Y_n$}, abbreviated here as $Y_{1:n}$. Using a dynamic programming algorithm, the Viterbi algorithm determines the most likely sequence of states {$X_1, \ldots, X_n$}, abbreviated here as $X_{1:n}$, corresponding to this sequence of observations:

$$X_{1:n}^* = \text{argmax}_{X_{1:n}} p(X_{1:n} \mid Y_{1:n})$$

The product of the likelihoods of these states gives the likelihood of the optimal state sequence $$p(Y_{1:n}) = \prod_{t=1}^{n} p(X_t^* \mid Y_{1:n})$$

In an exemplary embodiment, this is taken to be the "score" of the observation sequence $Y_{1:n}$ under the given HMM model. Each HMM provides such a likelihood score, and the unseen sequence is tagged with the label of the sequence on which the highest scoring HMM was trained.

There are two main design factors in this method: how many HMMs to train, and on which subset of sequences to train them. FIG. 8 is an illustration 800 of an algorithm that provides a clustering approach for HMM training, in accordance with an exemplary embodiment. Referring to FIG. 8, in an exemplary embodiment, one method, described in Algorithm 1 and illustrated in FIG. 8, uses an expectation-maximization approach to discover which subset of sequences to train each HMM on, using some small number N of HMMs.

At the beginning of training, each sequence in the training set is assigned to a random cluster between 1 and N. Each of the N HMMs is randomly initialized. For each training iteration, each respective HMM is trained on the cluster of sequences assigned to it. Each sequence is then reassigned to the HMM which gives it the highest score.

This process is repeated until none of the sequences change their assignment, indicating that each HMM fits the sequences in its cluster better than any other HMM. This method strikes a balance between the generality of the first method and the specificity of the second method, because each HMM learns a behavior averaged over a handful of sequences, but fits only a specific subset of sequences matching this behavior. Furthermore, these behaviors are learned and not prescribed.

For optimal performance, it is important to select the right number of states in the HMMs. This is done by splitting both datasets of anomalous and normal sequences into training and validation, or evaluation, datasets. In an exemplary embodiment, 60% of each dataset is taken as the training data, and 40% is reserved for validation. After training each approach, all of the sequences in the validation datasets are classified as is appropriate for the method. The number of false positives (i.e., normal sequences that were classified as anomalous) and false negatives (i.e., anomalous sequences that were classified as normal) are then calculated.

This analysis may be performed for each possible setting of the number of states. The number of states that minimizes the above described error rates is then selected.

Accordingly, with this technology, an optimized process for using algorithms that employ HMMs for detecting anomalous sequences of events in stream data is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for detecting an anomalous sequence of events in stream data, the method being implemented by at least one processor, the method comprising:

receiving, by the at least one processor, a first set of raw data;

analyzing, by the at least one processor, the first set of raw data in order to determine a first event sequence;

applying, by the at least one processor, a first Hidden Markov Model (HMM) to the first event sequence in order to generate a first output; and determining, by the at least one processor based on the first output, whether the first event sequence is classifiable as being an anomalous event sequence, wherein the first HMM is selected from among a plurality of HMMs that are trained by using a randomized cluster of event sequences and that are configured to generate respective scores based on a result of applying a predetermined algorithm, and wherein the first HMM is selected based on a highest one of the generated respective scores, and wherein the method further comprises:

after the receiving of the first set raw data and before the analyzing of the first set of raw data, preprocessing the first set of raw data by deleting without augmentation of missing data prior to determination of the first event sequence, wherein the deleting includes performing at least one from among removing at least one null value, removing at least one incomplete action, and eliminating at least one duplication, and wherein the augmentation includes tokenization of data.

2. The method of claim 1, wherein the analyzing comprises assigning a predetermined first time interval to the first set of raw data in order to determine whether a particular event is eligible for inclusion in the first event sequence, wherein the inclusion is based solely on temporal placement and not on threshold evaluation.

3. The method of claim 2, wherein for each respective pair of consecutive events that are determined as being eligible for inclusion in the first event sequence, the analyzing further comprises comparing a predetermined second time interval with a corresponding pause between a first event of the respective pair and a second event of the respective pair in order to determine whether the second event remains eligible for inclusion in the first event sequence.

4. The method of claim 1, wherein the analyzing further comprises tokenizing the raw data in order to generate a first set of actions that is attributable to at least one from among a first agent, a first process identifier, and a first account.

5. The method of claim 1, wherein, the first output includes, for each respective event included in the first event sequence, a normalized magnitude value computed by comparing a size metric of the respective event with size metrics of other events in a same sequence, wherein the normalized magnitude value reflects the relative size ranking of the respective event within the first event sequence.

6. The method of claim 5, further comprising categorizing each value included in the first output as referring to one from among a small action, a medium-sized action, and a large action.

7. The method of claim 1, further comprising: before the applying of the first HMM, training the first HMM by using first historical data that relates to known normal event sequences and second historical data that relates to known anomalous event sequences.

8. The method of claim 1, wherein the applying of the HMM comprises providing a first set of observations as an input, and the first output includes a score of the first event sequence that indicates a likelihood that the first event sequence occurs based on the first set of observations.

9. A computing apparatus for detecting an anomalous sequence of events in stream data, the computing apparatus comprising:

a processor;

a memory; and a communication interface coupled to each of the processor and the memory, wherein the processor is configured to:

receive, via the communication interface, a first set of raw data;

analyze the first set of raw data in order to determine a first event sequence;

apply a first Hidden Markov Model (HMM) to the first event sequence in order to generate a first output; and determine, based on the first output, whether the first event sequence is classifiable as being an anomalous event sequence, wherein the first HMM is selected from among a plurality of HMMs that are trained by using a randomized cluster of event sequences and that are configured to generate respective scores based on a result of applying a predetermined algorithm, and wherein the first HMM is selected based on a highest one of the generated respective scores, and wherein the processor is further configured to: after the first set raw data has been received and before the analysis of the first set of raw data, preprocess the first set of raw data by deleting without augmentation of missing data prior to determination of the first event sequence, wherein the deleting includes performing at least one from among removing at least one null value, removing at least one incomplete action, and eliminating at least one duplication, and wherein the augmentation includes tokenization of data.

10. The computing apparatus of claim 9, wherein the processor is further configured to assign a predetermined first time interval to the first set of raw data in order to determine whether a particular event is eligible for inclusion in the first event sequence, wherein the inclusion is based solely on temporal placement and not on threshold evaluation.

11. The computing apparatus of claim 10, wherein for each respective pair of consecutive events that are determined as being eligible for inclusion in the first event sequence, the processor is further configured to compare a predetermined second time interval with a corresponding pause between a first event of the respective pair and a second event of the respective pair in order to determine whether the second event remains eligible for inclusion in the first event sequence.

12. The computing apparatus of claim 9, wherein the processor is further configured to tokenize the raw data in order to generate a first set of actions that is attributable to at least one from among a first agent, a first process identifier, and a first account.

13. The computing apparatus of claim 9, wherein, the first output includes, for each respective event included in the first event sequence, a normalized magnitude value computed by comparing a size metric of the respective event with size metrics of other events in a same sequence, wherein the normalized magnitude value reflects the relative size ranking of the respective event within the first event sequence.

14. The computing apparatus of claim 13, wherein the processor is further configured to categorize each value included in the first output as referring to one from among a small action, a medium-sized action, and a large action.

15. The computing apparatus of claim 9, wherein the processor is further configured to: before the application of the first HMM, train the first HMM by using first historical data that relates to known normal event sequences and second historical data that relates to known anomalous event sequences.

16. The computing apparatus of claim 9, wherein the application of the HMM comprises providing a first set of observations as an input, and the first output includes a score of the first event sequence that indicates a likelihood that the first event sequence occurs based on the first set of observations.

17. A non-transitory computer readable storage medium storing instructions for detecting an anomalous sequence of events in stream data, the storage medium comprising executable code which, when executed by a processor, causes the processor to:

receive a first set of raw data;

analyze the first set of raw data in order to determine a first event sequence;

apply a first Hidden Markov Model (HMM) to the first event sequence in order to generate a first output; and determine, based on the first output, whether the first event sequence is classifiable as being an anomalous event sequence, wherein the first HMM is selected from among a plurality of HMMs that are trained by using a randomized cluster of event sequences and that are configured to generate respective scores based on a result of applying a predetermined algorithm, and wherein the first HMM is selected based on a highest one of the generated respective scores, and wherein when executed by the processor, the executable code further causes the processor to: after the first set raw data has been received and before the analysis of the first set of raw data, preprocess the first set of raw data by deleting without augmentation of missing data prior to determination of the first event sequence, wherein the deleting includes performing at least one from among removing at least one null value, removing at least one incomplete action, and eliminating at least one duplication, and wherein the augmentation includes tokenization of data.

\* \* \* \* \*